(12) United States Patent
Cerveny

(10) Patent No.: US 10,272,599 B2
(45) Date of Patent: Apr. 30, 2019

(54) ONE-PIECE HINGED CLOSURE FOR EQUIPPING A CONTAINER

(71) Applicant: NESTEC S.A., Vevey (CH)

(72) Inventor: Jean-Paul Cerveny, Vittel (FR)

(73) Assignee: Nestec S.A., Vevey (CH)

( * ) Notice: Subject to any disclaimer, the term of this patent is extended or adjusted under 35 U.S.C. 154(b) by 355 days.

(21) Appl. No.: 15/147,314

(22) Filed: May 5, 2016

(65) Prior Publication Data

US 2016/0243735 A1 Aug. 25, 2016

Related U.S. Application Data

(62) Division of application No. 14/123,694, filed as application No. PCT/EP2012/060817 on Jun. 7, 2012, now Pat. No. 9,376,243.

(30) Foreign Application Priority Data

Jun. 7, 2011 (EP) .................................... 11168943

(51) Int. Cl.
*B29C 45/26* (2006.01)
*B29C 45/00* (2006.01)
(Continued)

(52) U.S. Cl.
CPC .......... *B29C 45/0017* (2013.01); *B29C 45/26* (2013.01); *B29D 99/0096* (2013.01);
(Continued)

(58) Field of Classification Search
CPC . B29C 45/0017; B29C 45/0081; B29C 45/26; B29C 45/2618; B29C 2045/0034
See application file for complete search history.

(56) References Cited

U.S. PATENT DOCUMENTS

| 200,883 A | 3/1878 | Weber |
|---|---|---|
| 408,364 A | 8/1889 | Traut |

(Continued)

FOREIGN PATENT DOCUMENTS

| EP | 0325894 | 8/1989 |
|---|---|---|
| JP | 2002079553 | 3/2002 |
| JP | 2006143321 | 6/2006 |

OTHER PUBLICATIONS

Japan Office Action for Application No. P2014-210922, Dispatch No. 030015, dated Jan. 26, 2016, 6 pages.
(Continued)

*Primary Examiner* — James P MacKey
(74) *Attorney, Agent, or Firm* — K&L Gates LLP

(57) ABSTRACT

A mold can form a one-piece container closure by injection molding. The closure may have a base portion that inwardly defines an opening centered about a base portion longitudinal axis and a hinged cap that is linked to the base portion by an outside hinge member. The hinge member may have two opposite ends that are respectively connected to the base portion and the cap, thus defining an elongated hinge member therebetween. A mold may include two parts which respectively define two internal cavities facing each other along a longitudinal axis of alignment that coincides with the base portion longitudinal axis. The two mold parts my be movable along the longitudinal axis of alignment between a closed position where they define together a mold jointing plane and an open position where they are spaced apart from each other for demolding the closure.

5 Claims, 6 Drawing Sheets

(51) Int. Cl.
  *B65D 47/08* (2006.01)
  *B29D 99/00* (2010.01)
  *B65D 55/16* (2006.01)
  *B29L 31/56* (2006.01)

(52) U.S. Cl.
  CPC ......... *B65D 47/08* (2013.01); *B65D 47/0842* (2013.01); *B65D 55/16* (2013.01); *B29L 2031/565* (2013.01)

(56) References Cited

U.S. PATENT DOCUMENTS

| | | | |
|---|---|---|---|
| 524,159 A | 8/1894 | Birnbaum | |
| 1,041,816 A | 10/1912 | Kopald | |
| 1,077,328 A | 11/1913 | Bowyer | |
| 1,421,885 A | 7/1922 | Abrams | |
| 1,778,625 A | 4/1929 | Davis | |
| 2,155,329 A | 12/1937 | Perdue | |
| 2,422,747 A | 4/1944 | Prichard et al. | |
| 2,727,547 A | 8/1953 | Moon | |
| 3,031,111 A | 4/1959 | Stull | |
| 2,977,973 A | 4/1961 | Chakine | |
| D218,733 S | 9/1970 | Melville et al. | |
| 3,537,676 A * | 11/1970 | Miller | B29C 45/26 249/59 |
| D226,555 S | 3/1973 | Weber et al. | |
| 3,874,570 A | 4/1975 | Katzman et al. | |
| 3,904,062 A | 9/1975 | Grussen | |
| 3,957,169 A | 5/1976 | Coursaut | |
| 4,197,955 A | 4/1980 | Luenser | |
| 4,340,352 A * | 7/1982 | Hayberg | B29C 37/0014 249/58 |
| 4,377,248 A | 3/1983 | Stull | |
| 4,420,092 A | 12/1983 | Finkelstein | |
| 4,449,640 A | 5/1984 | Finkelstein | |
| 4,474,302 A * | 10/1984 | Goldberg | B65D 39/0017 215/256 |
| 4,534,478 A | 8/1985 | Sawicki | |
| 4,534,483 A | 8/1985 | Kassis et al. | |
| 4,548,332 A | 10/1985 | Neat | |
| 4,557,393 A | 12/1985 | Boik | |
| 4,564,114 A | 1/1986 | Cole | |
| 4,573,602 A | 3/1986 | Goldberg | |
| 4,583,652 A | 4/1986 | Goldberg | |
| 4,586,622 A | 5/1986 | Walldorf | |
| 4,655,363 A | 4/1987 | Neat | |
| 4,696,408 A | 9/1987 | Dubach | |
| 4,711,360 A | 12/1987 | Ullman | |
| 4,733,801 A * | 3/1988 | Scammell | B29C 45/36 215/235 |
| 4,805,792 A | 2/1989 | Lecinski, Jr. | |
| 4,949,883 A | 8/1990 | Dubach | |
| 5,148,912 A | 9/1992 | Nozawa | |
| 5,215,204 A | 1/1993 | Beck et al. | |
| 5,200,153 A | 4/1993 | Carr et al. | |
| 5,207,783 A | 5/1993 | Burton | |
| 5,257,708 A | 11/1993 | Dubach | |
| 5,435,456 A | 7/1995 | Dubach | |
| D373,706 S | 9/1996 | Gregg | |
| 5,593,054 A | 1/1997 | Glynn | |
| 5,605,240 A | 2/1997 | Guglielmini | |
| 5,605,241 A | 2/1997 | Imperioli | |
| 5,723,085 A * | 3/1998 | Abrams | B29C 45/006 264/238 |
| 5,725,115 A | 3/1998 | Bosl et al. | |
| 5,794,308 A | 8/1998 | Rentsch et al. | |
| 6,510,971 B1 * | 1/2003 | Martin | B29C 33/44 215/237 |
| 6,971,531 B1 | 12/2005 | Dubach | |
| 7,073,679 B1 | 7/2006 | Lagler et al. | |
| D536,974 S | 2/2007 | Smith et al. | |
| D536,975 S | 2/2007 | Smith et al. | |
| D556,575 S | 12/2007 | Nusbaum et al. | |
| D593,856 S | 6/2009 | Kubler | |
| 7,611,025 B2 | 11/2009 | Nusbaum et al. | |
| 7,762,438 B2 | 7/2010 | Skillin | |
| 7,954,659 B2 | 6/2011 | Zuares et al. | |
| 8,235,236 B2 | 8/2012 | Zuares et al. | |
| 8,469,213 B2 | 6/2013 | Ishii et al. | |
| 8,490,805 B2 | 7/2013 | Giraud et al. | |
| 8,602,234 B2 | 12/2013 | Hayashi | |
| 8,720,716 B2 | 5/2014 | Campbell | |
| 8,794,460 B2 * | 8/2014 | Druitt | B65D 47/0809 215/235 |
| 8,807,371 B2 | 8/2014 | Zuares et al. | |
| 2003/0024930 A1 | 2/2003 | Smith et al. | |
| 2003/0057209 A1 | 3/2003 | Seelhofer | |
| 2004/0016715 A1 | 1/2004 | Strikovic | |
| 2004/0256387 A1 | 12/2004 | Smith | |
| 2005/0116382 A1 | 6/2005 | Nusbaum et al. | |
| 2005/0173367 A1 | 8/2005 | Nusbaum | |
| 2005/0173368 A1 | 8/2005 | Nusbaum et al. | |
| 2008/0061469 A1 | 3/2008 | Elmer | |
| 2008/0073346 A1 | 3/2008 | Zuares et al. | |
| 2009/0101646 A1 | 4/2009 | Paul et al. | |
| 2009/0188885 A1 | 7/2009 | Nichols | |
| 2010/0005641 A1 | 1/2010 | Druitt et al. | |
| 2010/0065589 A1 | 3/2010 | Skillin | |
| 2010/0258520 A1 | 10/2010 | Giraud et al. | |
| 2010/0326948 A1 | 12/2010 | Campbell | |
| 2011/0000137 A1 | 1/2011 | Druitt et al. | |
| 2011/0114593 A1 | 5/2011 | Ishii et al. | |
| 2011/0226769 A1 | 9/2011 | Zuares et al. | |
| 2012/0260487 A1 | 10/2012 | Nicholas | |
| 2012/0312827 A1 | 12/2012 | Zuares et al. | |

OTHER PUBLICATIONS

International Search Report for International Application No. PCT/EP2012/060817 dated Jul. 13, 2012.

International Preliminary Report on Patentability for corresponding International Application No. PCT/EP2012/060817 dated Dec. 27, 2013.

* cited by examiner

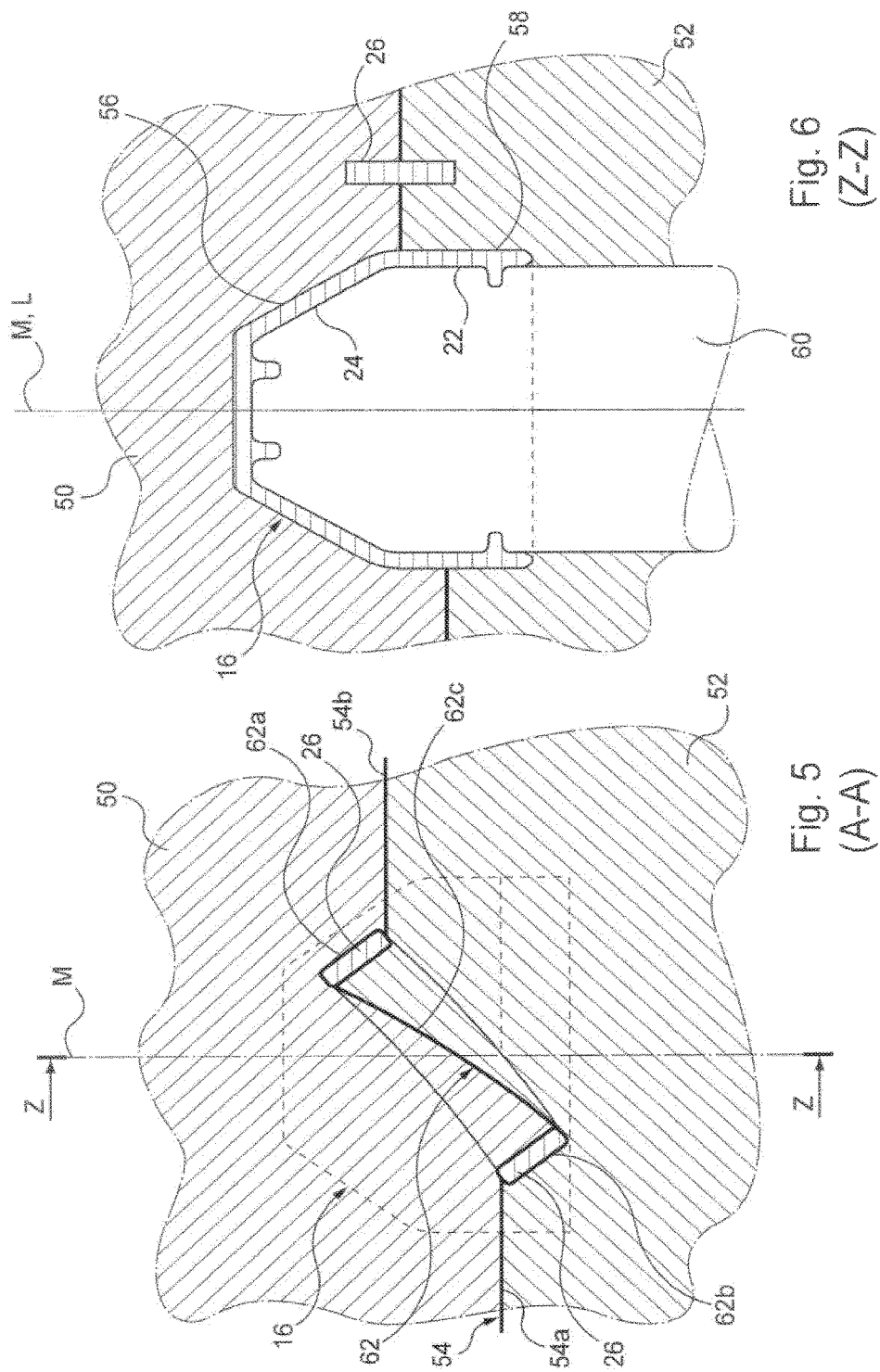

ONE-PIECE HINGED CLOSURE FOR EQUIPPING A CONTAINER

CROSS REFERENCE TO RELATED APPLICATIONS

This application is a divisional of U.S. application Ser. No. 14/123,694 filed Dec. 3, 2013, now U.S. Pat. No. 9,376,243, which is a National Stage of International Application No. PCT/EP2012/60817 filed Jun. 7, 2012, which claims priority to European Patent Application No. 11168943.6 filed Jun. 7, 2011, the entire contents of which are incorporated herein by reference.

FIELD OF THE INVENTION

The present invention concerns a closure for a liquid container and to a mould used in the manufacturing of the closure.

BACKGROUND

It is known to equip the neck of a container such as a liquid container, e.g. a bottle, with a closure having two parts connected together by an outboard hinge.

The closure comprises a cap and a base portion that is disposed around the liquid container neck. The cap covers the opening defined by the liquid container neck in a closed position.

Typically, the hinge is vertically oriented when the liquid container is in an upright position. More particularly, the hinge is parallel to the symmetrical axis of the liquid container neck when the cap covers the opening.

Known tamperproof means are provided between the cap and the base portion before the liquid container is put in the commerce.

For example, these tamperproof means may take the form of connecting bridges linking the cap and the base portion when the cap covers the opening of the liquid container.

Before using the liquid container for the first time a consumer has to deform and break these tamperproof means, thereby enabling separation of the cap and the base portion from each other and opening of the liquid container.

When the consumer moves the cap from the closed position to an open position where it is sufficiently spaced apart from the base portion, the cap does not remain in this clearing position due to the elasticity of the hinge.

Thus, the cap tends to move back close to the liquid container aperture, thereby causing inconvenience to the consumer willing to drink directly from the liquid container.

More particularly, the face of the consumer may come into contact with the cap during use of the liquid container.

The present invention aims at remedying this drawback.

SUMMARY

In this respect, the invention relates to a one-piece closure as defined herein.

According to the invention, the hinge member is formed integrally with the cap and base portion so as to form a one-piece closure.

The hinge member is a device, piece or member which links/connects the cap to the fixed base portion enabling the cap to move from a closed position in which the cap closes the aperture to an open position. In the course of this movement the cap and the hinge member move relative to the fixed base portion.

When arranged in its open position the hinged cap is disposed in a lateral position which leaves the aperture unobstructed thanks to the initial inclination of the hinge member.

In this position the cap is held clearer of aperture than the prior art cap with a vertically-extending hinge member.

Thus, even though the hinge member is flexible the cap in the open position gives rise to less interference with the face of the consumer than the prior art cap.

More particularly, the cap according to the invention performs a complex 3D movement which is not a 2D movement (rotation in a vertical plane) as in the prior art. Put it another way, the cap follows a path which is not in a vertical plane. In the course of this movement the cap moves radially away from the base portion longitudinal axis and performs a 3D rotation so as to occupy a laterally oriented position in the open position.

In this position, the cap is not symmetrically arranged relative to a vertical plane containing the base portion longitudinal axis as in the prior art.

It is to be noted that the closure according to the invention is easier to manufacture than prior art closures.

Furthermore, the inclined position of the hinge member in the closed position of the cap makes it possible to have a longer hinge member than the prior art vertically-extending one.

A longer hinge member enables improved clearance positioning of the cap in its open position. This is because the cap is farther from the base portion in the open position than in the prior art.

It is to be noted that the hinge member is of generally flat shape.

According to another feature, the cap is centered about a cap axis that coincides with the base portion longitudinal axis in the closed position and that does not intersect with the base portion longitudinal axis in the open position.

Thus, even though the flexibility of the hinge member tends to move back the cap towards the base portion the cap nevertheless occupies a position that is at a greater distance from the base portion and the liquid container aperture than in the prior art. It therefore reduces inconvenience for the user of the liquid container.

Still according to another feature, the hinge member has an elongated shape.

Furthermore, the hinge member may have an overall shape of a strip that has a curved shape when fastened to the closure.

The invention also relates to a container comprising:
a neck having an aperture, and
a one-piece closure mounted on the neck for closing said aperture.

The one-piece closure equipping the container is as briefly mentioned above.

Thus, if, for instance, the container is a liquid container a user/consumer may directly drink a beverage from the container of the invention in a more convenient manner.

This advantage is provided at least by the closure disclosed herein.

However, the container according to the invention is not limited to a liquid container. For example, the container may alternatively contain other substances as gel, powder, pills, etc.

According to a further aspect, the invention relates to a mould for forming a one-piece closure of a container by injection moulding.

This mould is in accordance with the mould disclosed herein.

The mould joint plane includes a local shape that is designed so as enable local moulding of an inclined hinge member made integrally with the base portion and cap.

Such a mould has a simplified structure compared to conventional injection moulds used for forming closures of containers by injection moulding.

This is because conventional injection moulds make use of a retractable insert for moulding the vertically-extending hinge member integrally with the cap and the base portion.

Such an insert is no longer necessary due to the inclination of the hinge member.

Furthermore, the demoulding operation proves to be easier than in the prior art since demoulding of the inclined hinge member only consists in axially separating the two mould parts from each other. One mould part or the two of them may be moved to perform demoulding.

According to one feature, the mould jointing plane locally includes a substantially Z-shaped or inverted Z-shaped interface portion for moulding the inclined hinge member.

This shape enables easy and fast demoulding of the inclined hinge member.

The Z-shaped or inverted Z-shaped interface portion is inclined with respect to the longitudinal axis of alignment of the two mould parts.

This locally Z-shaped interface portion may have two legs and a middle portion extending obliquely between these two legs. One of the legs is located at a greater height than the other leg and, therefore, is called upper leg, while the other is called lower leg.

The inclination of the thus shaped interface portion is such that the highest end of the lower leg is lower than the lowest end of the upper leg.

Furthermore, the highest end of the upper leg and the lowest end of the lower leg must not be aligned along the vertical direction but along an axis that is inclined with respect to said vertical direction. This axis may be very close to the vertical direction but at several degrees thereto.

The locally-shaped interface portion may be oriented clockwise or anticlockwise relative to the mould parts axis of alignment.

According to another feature, the substantially Z-shaped or inverted Z-shaped interface portion is in a cross-section plane that is located outside the cap and that intersects the hinge member.

According to still a further aspect, the invention relates to a method of injection molding.

The injection moulding method is easier to implement than the conventional methods for the reasons already given above.

According to one feature, the two mould parts define therebetween a local recess that radially extends outwardly from said internal cavities, said removable central insert defining together with the inner walls of said cavities a space that is filled by the injected liquid material for moulding the base portion and the cap, said space being in communication with said local recess and filled by the injected liquid material for moulding the inclined hinge member.

BRIEF DESCRIPTION OF THE DRAWINGS

Additional features and advantages of the present invention are described in, and will be apparent from, the description of the presently preferred embodiments which are set out below with reference to the drawings in which:

FIG. 5 is a schematic view of the mould interface used for moulding FIG. 4 closure on section plane AA;

FIG. 6 is a cross-section view of FIG. 5 mould on section plane ZZ;

DETAILED DESCRIPTION OF THE INVENTION

Figure 1:
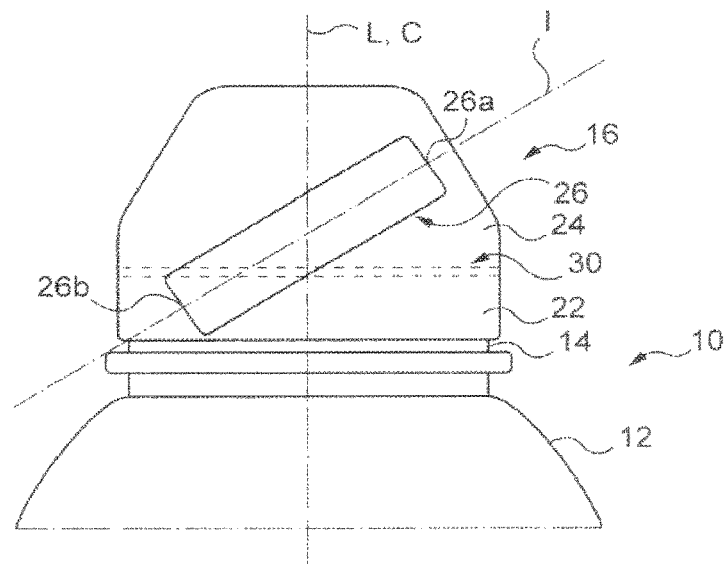
FIG. 1 is a schematic view of a closure mounted on the neck of a liquid container (partly represented) according to an embodiment of the invention, when the closure is in a closed position.
Figure 2:
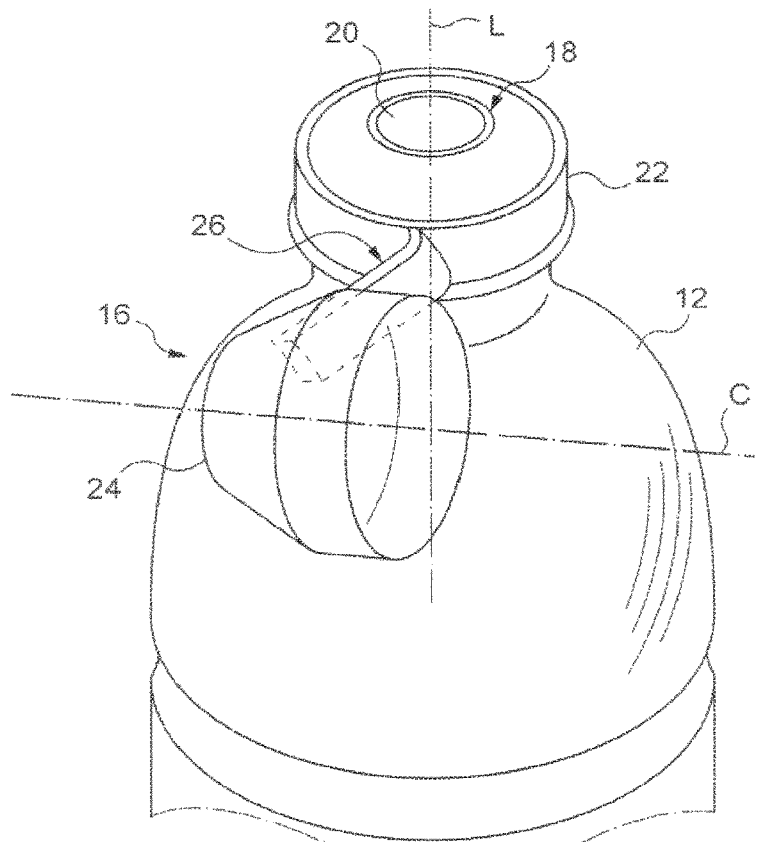
FIG. 2 is a schematic perspective view of the FIG. 1 closure in an open position.

FIGS. 1 and 2 represent partial views of a liquid container 10 (e.g. a bottle of water) in a vertical position.

Liquid container 10 comprises a body 12 that is partly represented in FIGS. 1 and 2 and a neck 14.

Neck 14 has an aperture through which the liquid contained within body 12 may be dispensed.

A one-piece closure 16 is mounted on the neck for closing the aperture.

The aperture is not represented in FIG. 1 where closure 16 is in a closed position.

Closure 16 is in an open position in FIG. 2. An additional plastic plug 18 (e.g. a sports cap) having a central upper hole 20 is located in the neck aperture so as to reduce the passage for dispensing liquid out of the container and facilitate dispensing for a consumer.

Closure 16 closes the restricted liquid passage 20 of FIG. 2 when in closed position.

Closure 16 comprises a base portion 22 that inwardly defines an opening centered about a base portion longitudinal axis L.

As represented in FIGS. 1 and 2, this portion 22 arranged around neck 14 is permanently secured thereto through conventional means, e.g. by undercut, snapping, interbeads, etc.

Closure 16 further comprises a cap 24 that is linked to the base portion 22 by an outside hinge member 26, also commonly referred to as "hinge" in the remainder of the description.

Hinge member or hinge 26 is made integrally with cap 24 and base portion 22 and, for example, is flexible. Hinge 26 is a flexible piece which enables cap 24 to move relative to fixed base portion 22.

Before first use of the liquid container the cap 24 is secured to the base portion 22 by connecting bridges, more generally by tamperproof means, which are obtained in a known manner when moulding the closure.

Before using the container for the first time a consumer/user has to deform and break these tamperproof means so as to enable separation of the cap and the base portion from each other with a view to opening the liquid container.

Hinge 26 is inclined with respect to the base portion longitudinal axis L when the cap is in the FIG. 1 closed position.

As represented in FIGS. 1 and 2, the hinge of the closure is oriented clockwise with respect to longitudinal axis L which represents, here, a vertical line. In an alternate embodiment depicted in FIG. 3, the closure 40 has an inclined hinge 42 that is oriented counter-clockwise.

The other features of hinge 42 are the same as those of FIGS. 1 and 2.

Reverting to FIG. 1, hinge 26 has two opposite ends 26a and 26b which together define the length of the hinge.

Hinge 26 has a rather elongated shape.

The two opposite ends 26a and 26b are respectively connected to cap 24 and base portion 22 and are integral therewith.

As represented in FIG. 1, opposite ends 26a and 26b are aligned along an axis I that is inclined with respect to the base portion longitudinal axis L when the cap is in the closed position.

Axis I defines the overall inclination of hinge 26.

In FIGS. 1 and 2 axis 1 is inclined at an angle of approximately 45° with respect to longitudinal axis L.

An angle of inclination around 45°, that is in a range lying from 45°− several degrees to 45°+ several degrees provides satisfactory results in terms of easiness of demoulding and clearance when the cap is in the open position (FIG. 2)

However, the invention is not limited to these values as will be explained later on.

Hinge 26 is generally flat and, for instance, has the overall shape of a strip.

Such a strip has a rectangular cross-section.

It is to be noted that the length of hinge 26 is greater than the length of a vertically-extending hinge as known in the prior art.

This greater length makes the hinge more flexible than the prior art shorter vertical hinges.

This contributes to obtaining a better clearance position when the cap is in the FIG. 2 open position.

Furthermore, the greater length of the inclined hinge makes it more robust from a mechanical point of view.

This robustness is a feature which is useful when opening the cap from FIG. 1 to FIG. 2 position where the hinge is subjected to torsion.

Thanks to the inclination of the hinge the hinged cap is arranged in an open position (FIG. 2) providing much less interference with the face of a consumer wanting to drink directly from the container.

In the open position the cap is arranged on a side of the container at a greater distance from the base portion and neck than in the prior art.

It is to be noted that in the FIG. 1 closed position cap 24 is centered about a cap axis C that coincides with the base portion longitudinal axis L, whereas in the FIG. 2 open position cap axis C does not intersect with axis L.

This arrangement is contrary to the prior art arrangement where the axis of the cap connected to its base portion by a vertical hinge still intersects the base portion longitudinal axis in the open position.

Put it another way, in the open position the interior of the cap is rather laterally oriented since it rotated about an axis that is not perpendicular to a vertical plane containing axis L (in the prior art, the cap rotates about an axis that is perpendicular to a vertical plane containing axis L).

Figure 4:
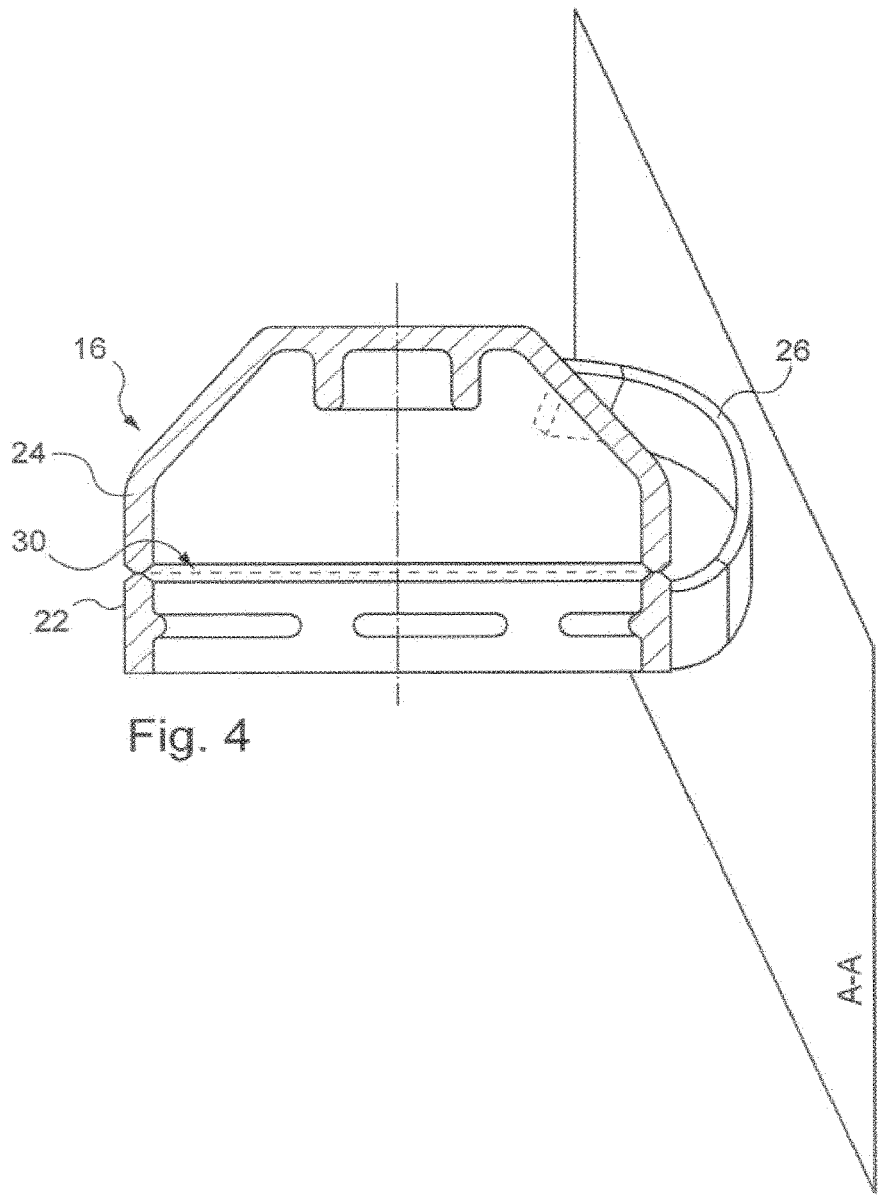
FIG. 4 is a cross-section view of the cap and base portion of FIG. 1 closure.

FIG. 4 depicts a schematic cross-section view of closure 16.

More particularly, only cap 24 and base portion 22 are represented in cross-section, whereas the hinge 26 is represented in a perspective view.

A cross-section plane AA intersects hinge 26 at a distance from cap 24.

Closure 16 is formed by injection moulding in a mould which comprises two parts. FIG. 5 schematically depicts the two mould parts 50 and 52 in a closed position in which they define together a mould jointing plane interface 54.

FIG. 5 is a cross-section view on the inclined section plane AA of FIG. 4.

Closure 16 is in the background and is represented in dotted lines.

FIG. 6 is a cross-section view on the section plane ZZ of FIG. 5.

As represented in FIG. 6, closure 16 has already been formed by an injection moulding process that will be described subsequently.

Each mould part 50, 52 respectively defines an internal cavity 56, 58, both internal cavities facing each other along a longitudinal axis of alignment denoted M.

The longitudinal axis of alignment M of the mould coincides with base portion longitudinal axis L.

The internal base portion 22 and cap 24 are moulded inside internal cavities 58 and 56 respectively in cooperation with a removable insert or core member 60 that has been introduced into said cavities.

Only a portion of hinge 26 is represented in FIG. 6 cross-section.

As represented in FIG. 5, mould jointing plane 54 is locally shaped so as to enable moulding of the inclined hinge 26.

Mould jointing plane 54 has a local portion that is located in the area between the closure (cap and base portion) and the hinge 26 and which is represented on a side view in FIG. 5. This local portion extends from a first segment that is adjacent to the highest point of hinge 26 and represented by point H in FIG. 5 to a second segment that is adjacent to the lowest point of hinge 26 and represented by point B.

On a 3D view this local portion assumes the shape of an helicoidal surface.

More particularly, mould jointing plane 54 includes a local interface portion that has a substantially Z shape or inverted Z shape for moulding inclined hinge 26.

Moulding hinge 26 having a clockwise orientation requires a substantially inverted Z-shaped interface portion.

Figure 3:
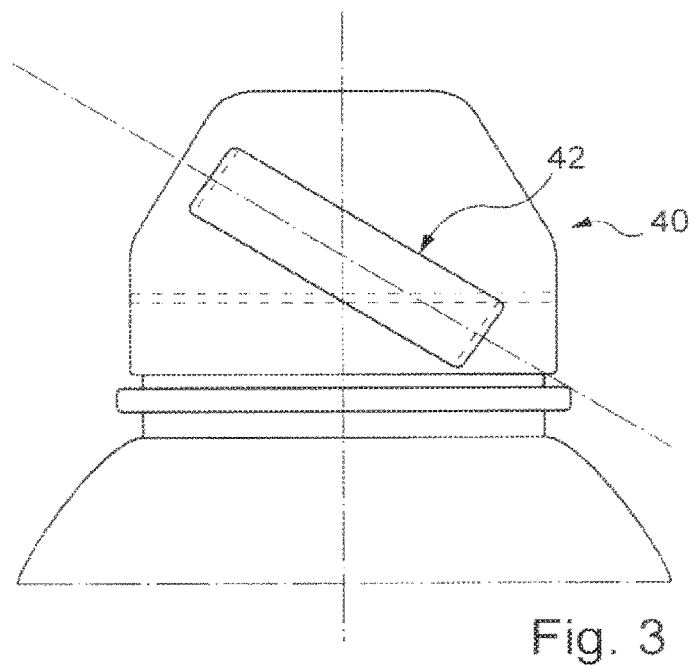
FIG. 3 is a schematic view analogue to FIG. 1 but with a different orientation of the hinge member.

Alternatively, a mould interface portion used for moulding the inclined hinge 42 in FIG. 3 (anti-clockwise orientation) is substantially Z-shaped.

The locally-shaped interface portion 62 is inclined with respect to the longitudinal axis of alignment M of the two mould parts.

More particularly, the substantially inverted Z-shaped interface portion 62 has two legs 62a and 62b and a middle portion 62c extending inclined between these two legs.

As represented in FIG. 5, the locally-shaped interface portion 62 interconnects two distant portions 64a and 64b of mould jointing plane 54 that are respectively located at different heights along axis M.

Figure 7:
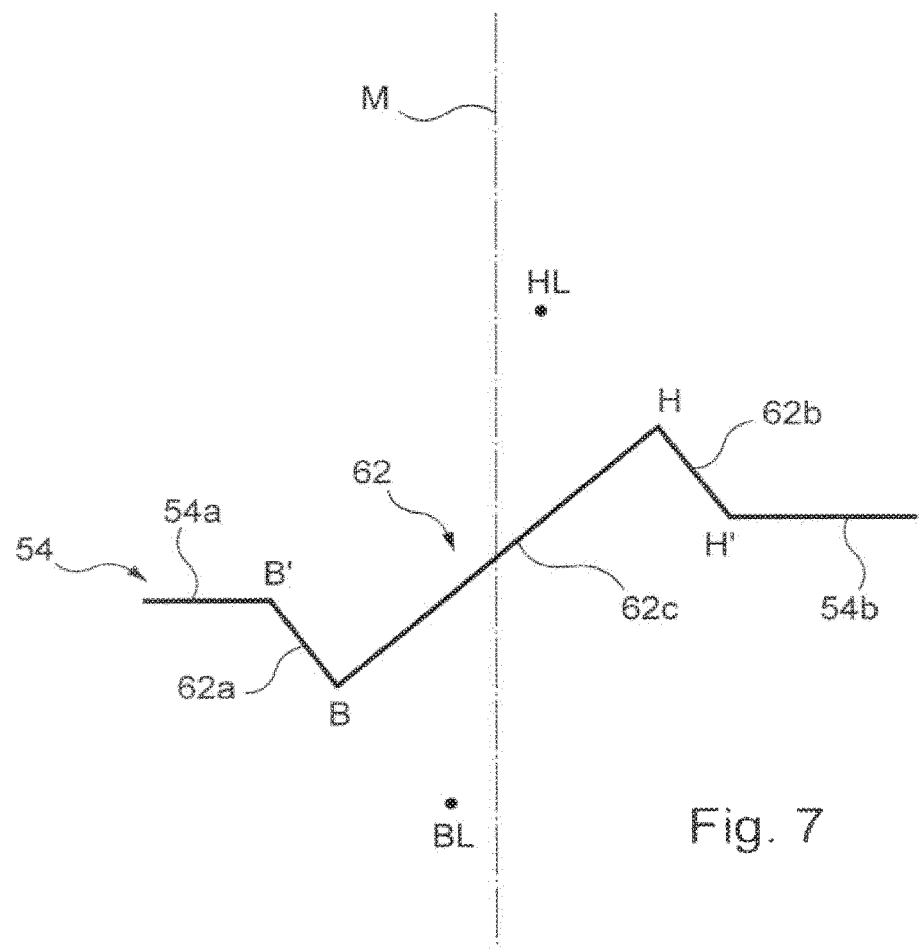
FIG. 7 schematically represents the mould interface local shape used for moulding the hinge member of FIG. 4 closure.

FIG. 7 schematically illustrates mould jointing plane 54 without the mould parts and closure.

The locally-shaped interface portion 62 is connected to an upper portion 54b of mould jointing plane 54 through upper leg 62a, whereas it is connected to lower portion 54a of mould jointing plane 54 through lower leg 62b.

As represented in FIG. 7, upper leg 62a has an upper end H and a lower end H', whereas lower leg 62b has an upper end B' and a lower end B.

As the locally-shaped interface portion 62 is inclined with respect to longitudinal axis M, upper leg 62a is located at a higher position than lower leg 62b. This therefore means that lower end H' of upper leg 62a is higher than upper end B' of lower leg 62b.

Thus, it is to be understood that the inclination of the locally-shaped interface portion with respect to axis M has an upper limit (in terms of angle) that is defined by the position of the lower end H' of upper leg 62a above the position of the upper end B' of lower leg 62b.

Conversely, this locally-shaped interface portion may be much less inclined with respect to axis M and the lower limit of this inclination is defined by respective points HL and BL (FIG. 7).

These points represent the respective positions that upper end H of upper leg 62a and lowest end B of lower leg 62b may occupy while still permitting easy demoulding of the inclined hinge.

The positions represented by points HL and BL are very close to axis M so that in this extreme position middle portion 62c may be inclined at a small angle of several degrees with respect to axis M.

For example, the small angle (extreme angle) may be of 5° approximately.

These furthest positions can be easily obtained through simple experiments and trials.

A method of forming by injection moulding a liquid container closure, as closure 16, will now be described with reference to FIGS. 8a-c.

This method comprises several steps.

According to a first step, the two parts 50 and 52 of the mould are provided.

As has been already mentioned above, these two mould parts respectively define internal cavities which are generally centrally-located within the mould parts.

Figure 8A:
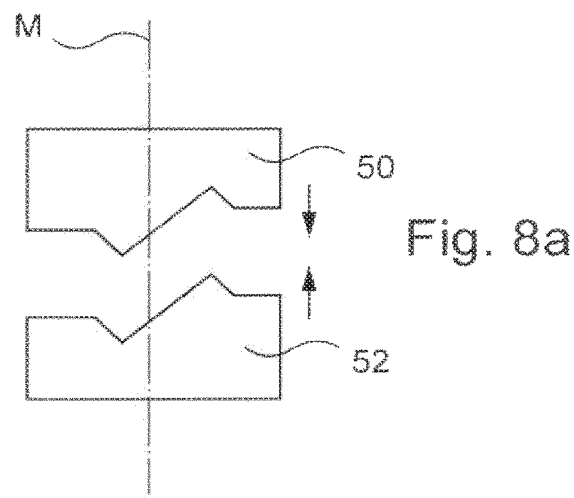
FIGS. 8a-c schematically depict steps of a method according to the invention.

According to a second step, the two mould parts are assembled together by being moved along longitudinal axis M as illustrated in FIG. 8a.

It is to be noted that only one of the two mould parts may alternatively be in a fixed position while the other mould part is movable.

Figure 8B:
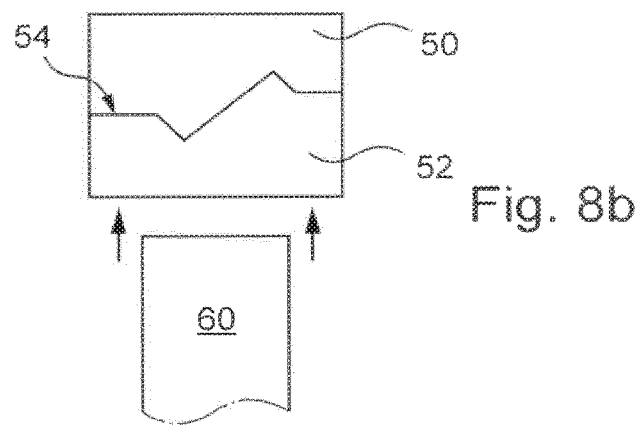

As represented in FIG. 8b, the two mould parts have been assembled together with their two internal cavities facing each other as also illustrated in FIGS. 5 and 6.

It is also to be noted that when assembled together the two mould parts define therebetween a local recess that radially extends outwardly from said central internal cavities 56 and 58.

This local recess has a complex 3D shape which cannot be easily represented in a perspective view. It is used for moulding the hinge member of the closure.

This recess can be seen only in part in the FIGS. 5 and 6 cross-sections where hinge 26 is apparent.

In a further step still illustrated in FIG. 8b, a removable insert or core member 60 is introduced into the two mould parts internal cavities in order to occupy a position that is represented in FIG. 6.

In this position a space is defined between insert 60 and the inner walls of cavities 56 and 58.

This space is in communication with the local recess defined above and which is intended for moulding hinge 26.

In a next step, a liquid material such as a thermoplastic resin is injected through injection channels (not represented in the drawings) which communicate with internal cavities 56 and 58. The above-defined space and local recess are thus filled by the injected liquid material.

The injection process is performed in a conventional manner, in particular under known temperature and pressure conditions which will not be detailed here.

Once one-piece closure 16 has been thus formed by injection moulding, insert 60 is withdrawn in a direction opposite to that represented in FIG. 8b with a view to demoulding the one-piece moulding.

Figure 8C:
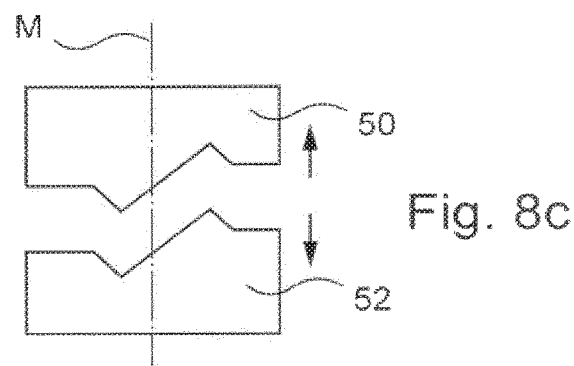

As represented in FIG. 8c, the two mould parts 50 and 52 are spaced part from each other for opening the mould and demoulding the closure and, in particular, hinge 26.

This demoulding step is quite easy to carry out since the two mould parts have only to be moved along the longitudinal axis of alignment M of the mould in the opposite direction to that one depicted in FIG. 8a.

This easy demoulding is made possible by virtue of the inclined hinge.

Contrary to prior art methods, there is no additional insert or drawer to be removed before separating the two mould parts from each other for demoulding the hinge.

This is because in the prior art the mould jointing plane used for moulding the vertical hinge is parallel to the axis of alignment of the mould parts, namely vertical, whereas in the present invention the mould jointing plane is inclined with respect to axis M.

Thanks to the inclined hinge the moulding and demoulding process is made easier and cheaper.

Furthermore, the injection mould is therefore made easier and more robust than in the past.

In addition, demoulding the closure by simply separating two mould parts along longitudinal axis M (vertical axis) makes it possible to increase the number of closures manufactured at a time.

The yield of the manufacturing process is therefore increased.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention is claimed as follows:

1. A mold for forming a one-piece container closure by injection molding, the closure comprising a base portion that inwardly defines an opening centred about a base portion longitudinal axis and a hinged cap that is linked to the base portion by an outside hinge member, the hinge member having two opposite ends that are respectively connected to the base portion and the cap thus defining an elongated hinge member therebetween, the mold comprising:

two parts which respectively define two internal cavities facing each other along a longitudinal axis of alignment that coincides with the base portion longitudinal axis, the internal cavities configured for molding the base portion and the cap, the two mold parts being movable along the longitudinal axis of alignment between a closed position where they define together a mold jointing plane and an open position where they are spaced apart from each other for demolding the closure, the mold jointing plane comprises an interface portion for molding the hinge member, the interface portion comprises a first leg, a second leg, and a middle portion that extends from the first leg to the second leg, the middle portion is inclined relative to the longitudinal axis of alignment of the two parts of the mold.

2. The mold of claim 1, wherein the interface portion is substantially Z-shaped or inverted Z-shaped.

3. The mold of claim 1, wherein the middle portion has a substantially rectangular cross section.

4. The mold of claim 1, wherein the interface portion is in a cross-section plane that is located outside the internal cavity configured for molding the cap and that intersects the internal cavity configured for molding the base portion.

5. The mold of claim 1, wherein the two mold parts comprise a first mold part that is fixed and a second mold part that is movable.

\* \* \* \* \*